United States Patent [19]
Tran

[11] Patent Number: 5,732,656
[45] Date of Patent: Mar. 31, 1998

[54] DECORATIVE WATERFALL FOR AQUARIUMS

[76] Inventor: Ngoc Anh Tran, 14, rue Mario-Capra, Vitry-sur-Seine, France, F-94400

[21] Appl. No.: 669,400

[22] PCT Filed: Jun. 27, 1994

[86] PCT No.: PCT/FR94/00775

§ 371 Date: Jun. 21, 1996

§ 102(e) Date: Jun. 21, 1996

[87] PCT Pub. No.: WO95/19105

PCT Pub. Date: Jul. 20, 1995

[30] Foreign Application Priority Data

Jan. 18, 1994 [FR] France ................................ 94 00493

[51] Int. Cl.$^6$ ................................................. A01K 63/00
[52] U.S. Cl. .......................................................... 119/254
[58] Field of Search ................................. 119/254, 256, 119/249, 246, 253, 255

[56] References Cited

U.S. PATENT DOCUMENTS

| | | |
|---|---|---|
| 3,057,094 | 10/1962 | Winkelman . |
| 3,390,665 | 7/1968 | Wininger . |
| 4,160,427 | 7/1979 | Holbrook ............................ 119/254 |
| 5,476,068 | 12/1995 | Townsend ........................... 119/256 |

FOREIGN PATENT DOCUMENTS 9107589  9/1991  Germany .

*Primary Examiner*—Gene Mancene
*Assistant Examiner*—Yvonne R. Abbott
*Attorney, Agent, or Firm*—Collard & Roe, P.C.

[57] ABSTRACT

A device for creating an ornamental cascade for use in an aquatic medium such as an aquarium. The device comprises an assembly of natural stones or ceramics, and means for generating a continuous flow of sand through and along the assembly to create the appearance of a cascade.

7 Claims, 2 Drawing Sheets

DECORATIVE WATERFALL FOR AQUARIUMS

BACKGROUND OF THE INVENTION

1. Field of the Invention

The invention relates to an improved structure for an ornamental cascade with a continuous circulation of sand, for use in an aquatic medium such as an aquarium.

2. The Prior Art

Structures of this kind are known from the prior art, namely U.S. Pat. Nos. 3,057,094, and 4,160,427.

SUMMARY OF THE INVENTION

The prior art structures fulfill their utilitarian and ornamental objective, but they have many drawbacks inherent to their building and to their composition. The present invention overcomes these drawbacks by using natural materials, which allows the arrangement of an ecologic medium in an aquarium, that is similar to the marine medium, which is necessary to keep fish alive.

To accomplish this objective, the cascade of this invention is obtained by assembling natural stones and/or ceramics or by a casting of natural stones and/or ceramics.

BRIEF DESCRIPTION OF THE DRAWINGS

The characteristics and advantages of this invention will be better understood while referring to the specification and to the appended drawings therein.

In the drawings, wherein similar reference characters denote similar elements throughout the several views.

DETAILED DESCRIPTION OF THE PREFERRED EMBODIMENT

Figure 1:
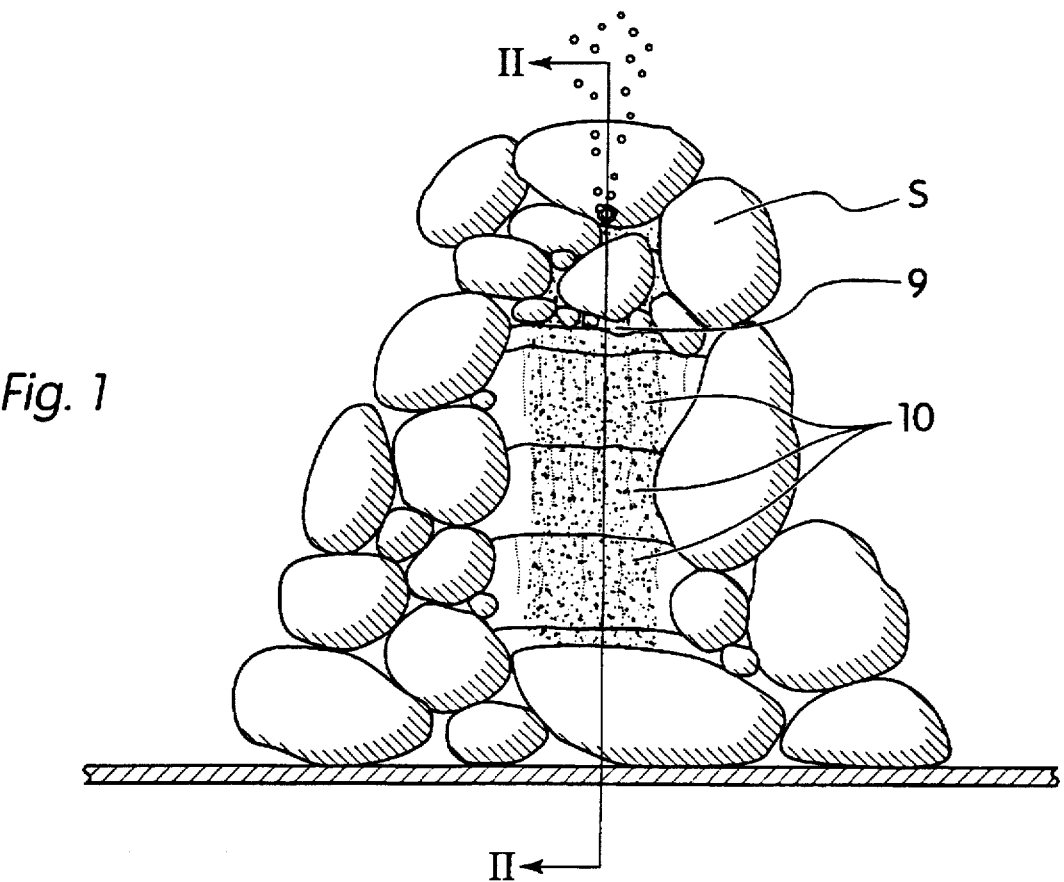
FIG. 1 is a general outer front view of the cascade of this invention.

Referring now in detail to the drawings and, in particular, FIG. 1, there is shown the structure S of the cascade, substantially formed by a superposition or a casting of natural stones and/or ceramics. Thus, the cascade is essentially free of any industrial chemical substance, which may pollute the water of the aquarium in which fish are immersed.

The essential elements of the cascade and its operation will be described with the help of FIG. 2, which represents a side view in whole section thereof.

Figure 2:
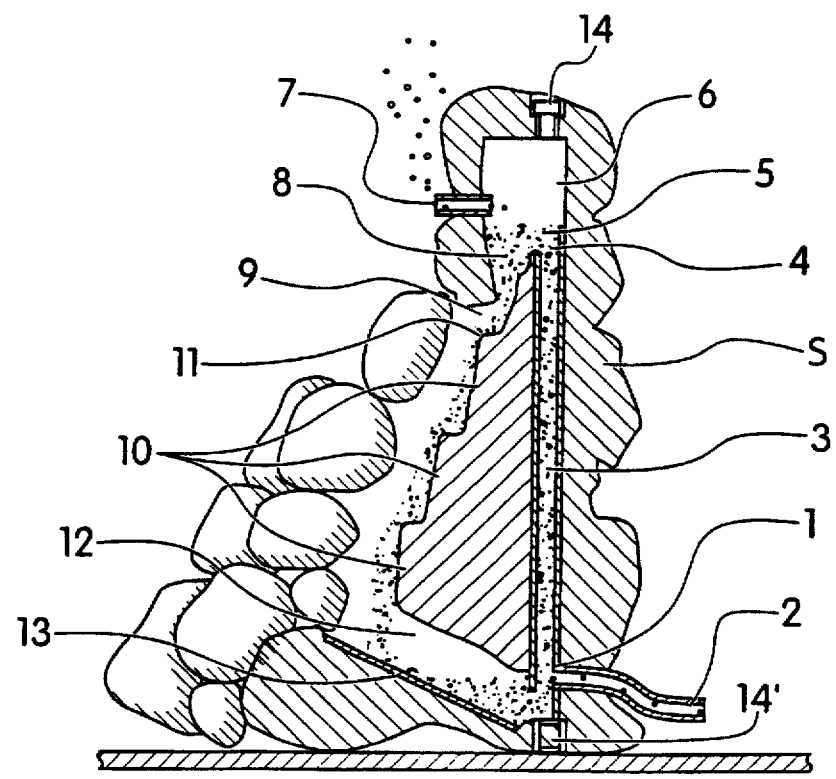
FIG. 2 is a side view in section of the cascade shown at FIG. 1.

As shown in FIG. 2, structure S includes at its lower part a sand container 12 having a glassed slope 13, which ends at an inlet 1 of a vertical pipe 3 for the ascension of the sand to the upper part of the structure. A transverse pipe 2 connects pipe 3 to an electric air pump of any type. The air pump is arranged at the outside of the aquarium and allows the ascension of a mixture sand, water and air in pipe 3 in a known manner, until it reaches part 5 of structure S after passing through end 4 of pipe 3.

At this point, the air and the sand separate. The air, which is lighter, flows upward towards a room 6 from which it escapes outside the structure, through an outlet 7. The mixture of sand and water flows through a restricted exit 8 and then along inclined plane 9. Inclined plane 9 has three steps arranged as a scale 10 in this example, but which may be in any amount so as to form a cascade staggered towards container 12. Upon reaching the bottom, the sand and water can proceed with a renewed cycle of operation that is identical to the one just described, wherein the sand and water flow from the bottom to the top through pipe 3 and from the top to the bottom of the structure along scale 10. This cycle continuously operates as long as the pump is operating.

The downward flow of the mixture of sand and water from point 4 of pipe 3 towards container 12 occurs in a molded part comprising a restricted way 8, that is arranged between the structure and an inclined plane 9 that extends to end 10. This part of the internal structure of the cascade may be rigidly locked to the external part, or formed with an inlaid part, which allows the same result, i.e., the cascading fall of the sand in front of the structure S.

Figure 3:
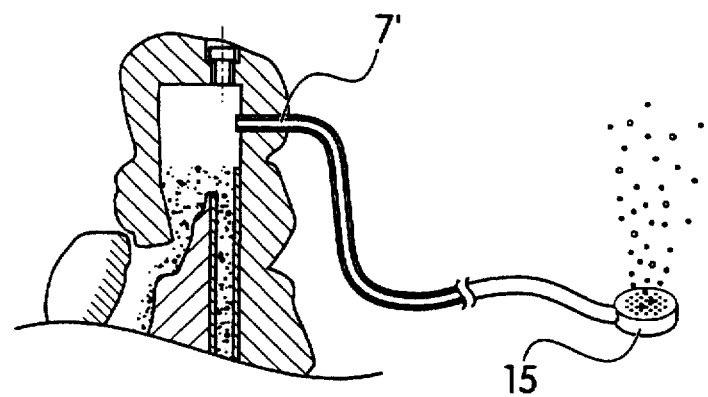
FIG. 3 is a partial side view of one embodiment of this invention.
Figure 4:
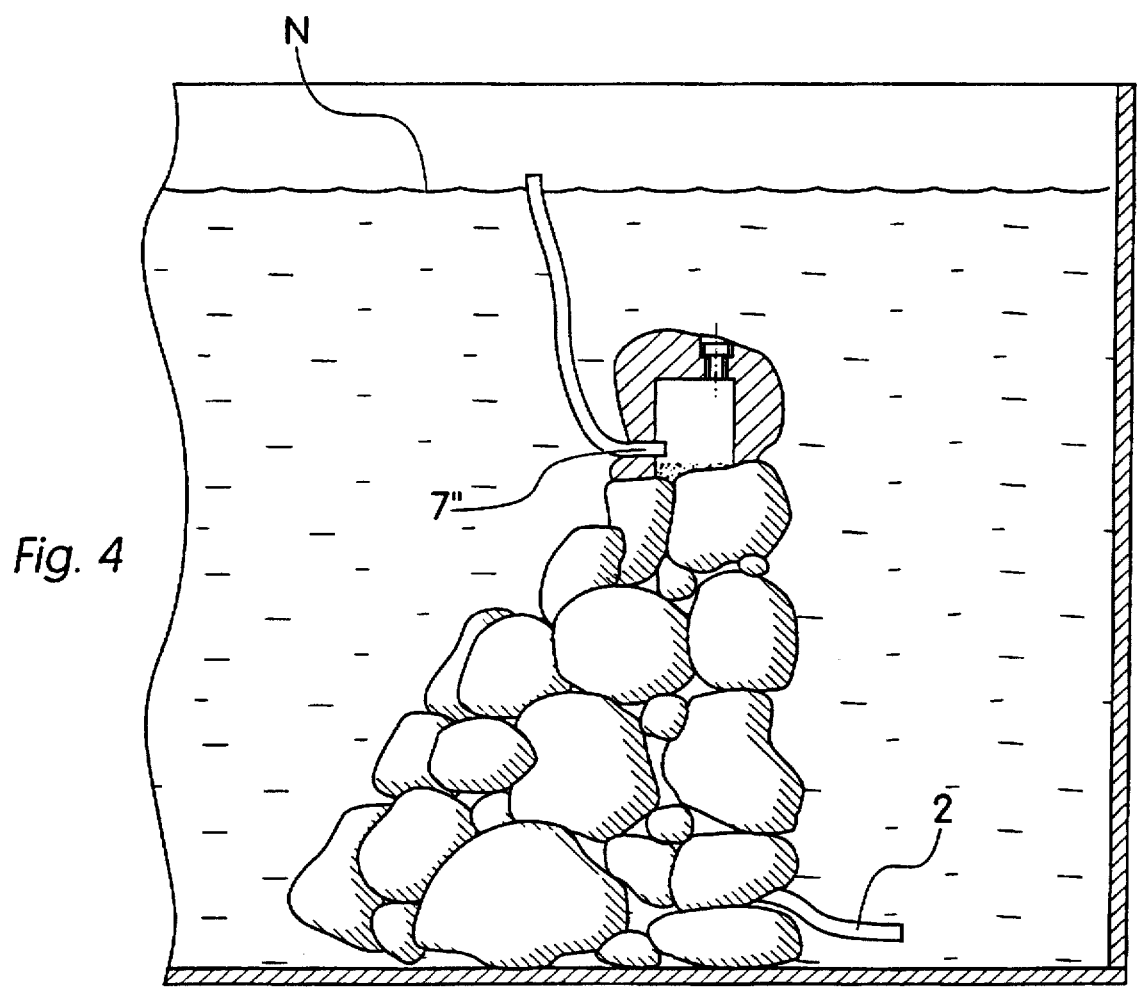
FIG. 4 is a side view of another embodiment according to this invention.

FIGS. 2, 3 and 4 represent variations in the performance of air outlet pipe 7. In FIG. 2, pipe 7 is arranged in the middle of the front face of structure S. In FIG. 3, pipe 7 is arranged on the back of structure S and is lengthened with a pipe 7' which connects it to an air diffuser 15 arranged on the inside of the aquarium. In FIG. 4, it is arranged at 7' and lengthened above the level N of the water in the aquarium.

During use, it may happen that the uptake pipe of the sand becomes clogged. To remedy this, a stopper 14 is provided, which when unscrewed, allows a rod to pass into pipe 3 to disengage it in case of clogging. In the same manner, a screwed stopper 14' allows, when unscrewed outside the aquarium, a rod to pass into pipe 3 to disengage it in case of clogging, which would cause a breakdown in the operation of the cascade.

Accordingly, while only several embodiments of the present invention have been shown and described, it is obvious that many changes and modifications may be made thereunto without departing from the spirit and scope of the invention.

What is claimed is:

1. A device for creating an ornamental cascade for use in an aquatic medium such as an aquarium, said device having a front side, a back side, a top and a bottom, comprising:

an assembly of articles selected from the group consisting of natural stones and ceramics; and means for generating a continuous flow of sand along said assembly, comprising:

a sand container located at the bottom of the device, a longitudinal pipe having an inlet located within the sand container for receiving sand from the sand container, and an outlet;

a transverse pipe connected to the longitudinal pipe and adapted to supply pressurized air to the longitudinal pipe;

an air pump for supplying pressurized air to the transverse pipe;

a room located within the device at the outlet of the longitudinal pipe for receiving the pressurized air;

an outlet pipe connected to the room for releasing the pressurized air from the device;

a restricted exit located at the outlet of the longitudinal pipe for receiving sand; and an inclined path extending from the restricted exit, along the assembly to the sand container, wherein sand from the sand container enters the inlet and ascends through the longitudinal pipe along with pressurized air from the transverse pipe, wherein the sand exits the longitudinal pipe, flows through the restricted exit, down the inclined path and back into the sand container, and wherein the pressurized air exits the longitudinal pipe through the outlet, flows into the room and out of the device through the outlet pipe.

2. A device according to claim 1, wherein the inclined path is comprised of a stepped surface extending down to the sand container, said stepped surface ensuring that the sand falls in a cascade into the sand container.

3. A device according to claim 1, wherein the outlet pipe is positioned horizontally and opens on the front side of the device, so that air exiting the device can escape into the aquatic medium.

4. A device according to claim 1, wherein the outlet pipe is located at the back of the device, and further comprising an air diffuser connected to the outlet pipe, so that air exiting the device flows through said air diffuser.

5. A device according to claim 1, wherein the outlet pipe is adapted to extend above the level of the aquatic medium, so that air exiting from the device escapes into the atmosphere.

6. A device according to claim 1, further comprising an opening in the top of the device and a screwed stopper for closing the opening, said opening adapted to allow a rod to pass through the opening and clear clogs in the longitudinal pipe.

7. A device according to claim 1, further comprising an opening in the bottom of the device, said opening and a screwed stopper for closing the opening, said opening being adapted to allow a rod to pass through the opening to clear clogs in the longitudinal pipe.

* * * * *